United States Patent
Resta

(10) Patent No.: US 6,220,457 B1
(45) Date of Patent: Apr. 24, 2001

(54) APPARATUS FOR TEMPORARILY STORING MANUFACTURED ITEMS, PARTICULARLY MATTRESSES

(75) Inventor: Roberto Resta, Faenza (IT)

(73) Assignee: Resta S.r.l., Faenza (IT)

( * ) Notice: Subject to any disclaimer, the term of this patent is extended or adjusted under 35 U.S.C. 154(b) by 0 days.

(21) Appl. No.: 09/320,666

(22) Filed: May 27, 1999

(30) Foreign Application Priority Data

Jun. 9, 1998 (IT) ............................................. BO98A0368

(51) Int. Cl.[7] .................................................. A47G 29/00
(52) U.S. Cl. .............................................................. 211/28
(58) Field of Search ............................... 211/28, 26, 1.51, 211/1.56, 1.57, 49.1, 59.4

(56) References Cited

U.S. PATENT DOCUMENTS

| | | | |
|---|---|---|---|
| 1,071,671 | * 8/1913 | McCurdy | 211/28 |
| 1,114,455 | * 10/1914 | Fisher | 211/28 |
| 2,444,776 | * 7/1948 | Kalning et al. | 211/28 |
| 3,357,569 | * 12/1967 | Goodman et al. | 211/28 |
| 4,474,525 | * 10/1984 | Yoshio . | |
| 4,961,273 | * 10/1990 | Fay . | |

FOREIGN PATENT DOCUMENTS

1245860 * 7/1967 (DE) .
2651365 * 5/1978 (DE) .

* cited by examiner

Primary Examiner—Alvin Chin-Shue
Assistant Examiner—Sarah Purol
(74) Attorney, Agent, or Firm—Guido Modiano; Albert Josif; Daniel O'Byrne

(57) ABSTRACT

An apparatus for temporarily storing manufactured items, particularly mattresses, comprising: a framework for supporting a plurality of horizontal and superimposed frames for supporting the mattresses to be stored, the framework being provided with guides for guiding the frames vertically; an actuation system for individually actuating the frames between a lowered position, in which they are mutually close so as to form a stack, and a raised position, in which they are mutually spaced by an extent which is greater than the height of the individual mattresses; a platform for receiving a mattress which lies above the upper frame of the stack; transfer elements for individually transferring and positioning the mattresses on the receiving platform and for individually removing the mattresses from the receiving platform, the transfer elements being synchronized with the actuation system for actuating the frames so that during the storage of the mattresses the upper frame of the stack is raised until the mattress is brought to a level which, with respect to the receiving platform, is greater than the height of one mattress, while during mattress removal the lowest of the raised frames is lowered below the receiving platform, so as to deposit the mattress onto the receiving platform.

17 Claims, 3 Drawing Sheets

APPARATUS FOR TEMPORARILY STORING MANUFACTURED ITEMS, PARTICULARLY MATTRESSES

BACKGROUND OF THE INVENTION

The present invention relates to an apparatus for temporarily storing manufactured items, particularly mattresses.

In mattress-making there is the need to temporarily store the mattresses between the various manufacturing steps by stacking them in order to reduce their bulk for packaging and transport. The temporary stacking of mattresses is currently performed manually and entails considerable physical effort on the part of the assigned personnel. The need accordingly arises for an apparatus which allows to store the mattresses during the idle times of the manufacturing process and to make them quickly available at the appropriate time without requiring excessive effort or wasting time.

SUMMARY OF THE INVENTION

The aim of the present invention is to meet the above needs of conventional devices, i.e., to provide a magazine for mattresses which allows to insert and remove the mattresses to be assigned to the various steps of the manufacturing process, all without requiring excessive physical effort and wasting time.

Within the scope of this aim, an object of the present invention is to provide an apparatus which has a simple structure, is relatively easy to provide in practice, safe in use, effective in operation and having a relatively low cost.

This aim and this object are both achieved by the present apparatus for temporarily storing manufactured items, particularly mattresses, characterized in that it comprises: a framework for supporting a plurality of horizontal and superimposed frames for supporting the mattresses to be stored, said framework being provided with means for guiding said frames vertically; means for individually actuating said frames between a lowered position, in which they are mutually close so as to form a stack, and a raised position, in which they are mutually spaced by an extent which is greater than the height of the individual mattresses; a platform for receiving a mattress which lies above the upper frame of said stack; means for individually transferring and positioning said mattresses on said receiving platform and for individually removing said mattresses from said receiving platform, said transfer and removal means being synchronized with said means for actuating said frames so that during the storage of the mattresses the upper frame of said stack is raised until the mattress is brought to a level which, with respect to the receiving platform, is greater than the height of one mattress, while during mattress removal the lowest of the raised frames is lowered below said receiving platform, so as to deposit the mattress onto said receiving platform.

BRIEF DESCRIPTION OF THE DRAWINGS

Further particularities will become apparent and evident from the detailed description of an embodiment of an apparatus of to the invention, illustrated only by way of non-limitative example in the accompanying drawings, characterized in that.

DESCRIPTION OF THE PREFERRED EMBODIMENTS

Figure 1:
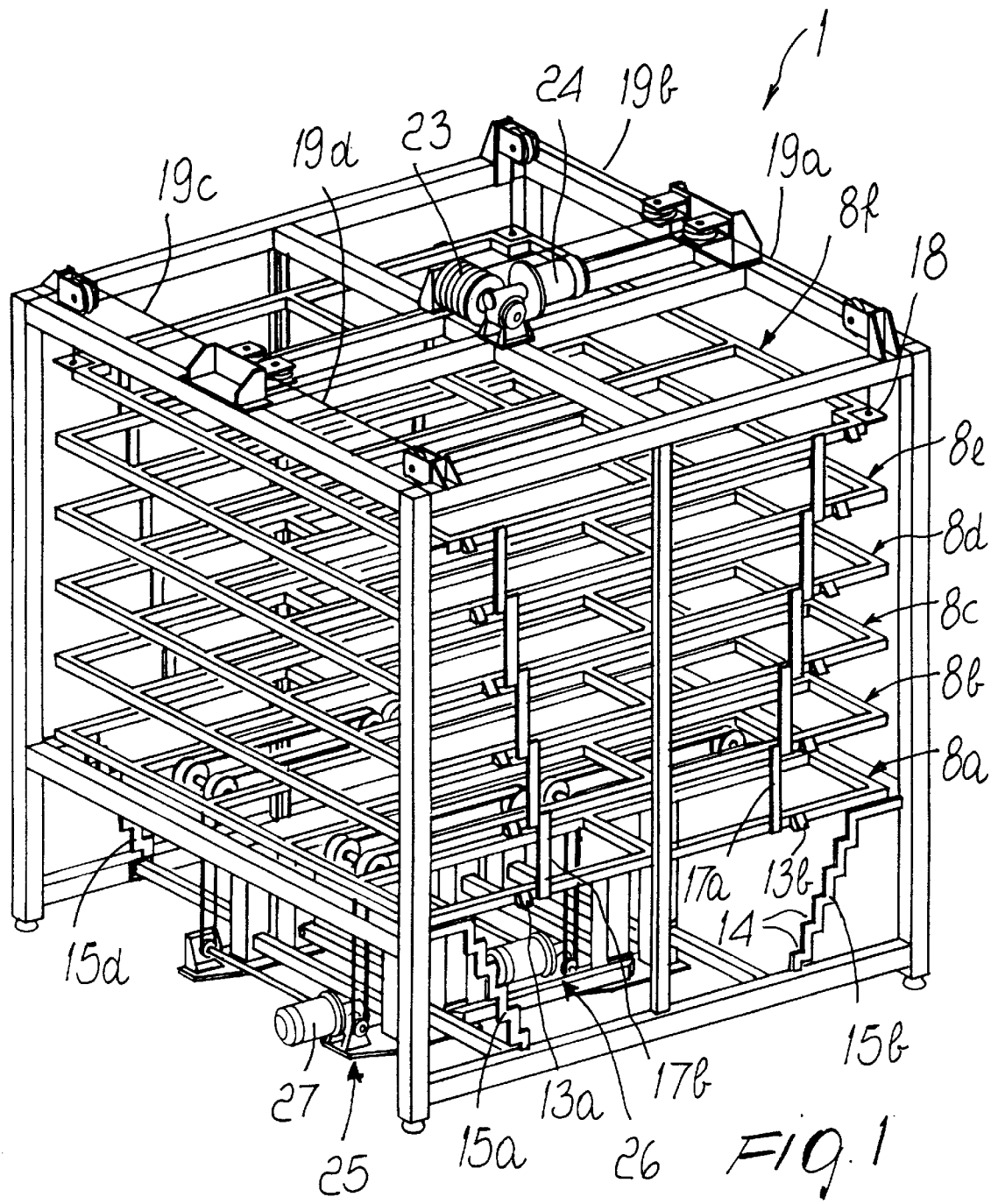
FIG. 1 is a perspective view of the apparatus with the mattress receiving frames in the raised position.

With reference to the above Figures, the apparatus is generally designated by the reference numeral 1 and comprises a framework which is formed by four vertical posts 2a, 2b, 2c, 2d which are fixed, by means of their upper ends, to the corners of a rectangle formed by four horizontal stringers 3a, 3b, 3c, 3d and, by means of their lower ends, to four more horizontal stringers 4a, 4b, 4c, 4d, in which the stringers 4a, 4b are arranged on two mutually opposite sides which correspond to the upper stringers 3a, 3b while the stringers 4c, 4d are arranged on the two remaining sides, which correspond to the upper stringers 3c, 3d and are raised with respect to the stringers 4a, 4b.

The framework, which rests on the floor by means of four feet 5, is further provided with two vertical guides 6a and 6b which are fixed to the median point of the superimposed stringers 3a, 4a and 3b, 4b and are provided with a slot 7 along the face that is directed inwards.

A magazine is arranged inside the framework and is composed of a plurality of frames 8a, 8b, 8c, 8d, 8e, 8f for supporting the mattresses to be stored. The frames are mutually stacked when the magazine is in the loading position and are raised one at a time after they have been loaded with one mattress each.

Each frame 8a–8f is rectangular and comprises four perimetric rods 9a, 9b, 9c, 9d, in which the mutually opposite rods 9c, 9d are mutually connected by two pairs of longitudinal members 10a, 10b and 10c, 10d. The longitudinal members 10b and 10c are mutually connected by a cross-member 11a, while two additional cross-members 11b, 11c connect the rods 9a, 9b to the longitudinal members 10a and 10d respectively.

Openings 12a, 12b remain between the pairs of longitudinal members 10a, 10b and 10c, 10d; as will become apparent hereinafter, the means for transferring the mattresses onto the frames and for removing them from said frames act through said openings.

Each frame 8a–8f is provided, on each one of the mutually opposite and parallel stringers 9a, 9b, with a pair of supporting teeth 13a, 13b and 13c, 13d which protrude outwards. The distance between the teeth 13a, 13b and 13c, 13d of each pair gradually decreases from the uppermost frame 8f toward the lowermost frame 8a so as to allow the stacking of the frames in the loading position by means of the resting of the pairs of teeth 13a, 13b and 13c, 13d on the steps 14 formed by four supporting strips 15a, 15b, 15c, 15d which join the posts 2a, 2b and 2c, 2d to the lower stringers 4a, 4b.

Respective pins 16 protrude from the median point of the stringers 9a, 9b of the frames 8a–8f from which the teeth 13a, 13b and 13c, 13d protrude; said pins slide within the slots 7 of the vertical guides 6a, 6b. Each frame 8a–8f is connected to the overlying one by means of extendable elements consisting of two pairs of vertical slotted rods 17a, 17b and 17c, 17d (see FIG. 2); each pair is fixed, by means of its lower end, to a respective rod 9a, 9b in the portion that lies between the teeth 13a, 13b and 13c, 13d of the frames 8a–8e except for the upper one 8f.

The upper ends of the rods 17a, 17b and 17c, 17d of each frame are shaped so as to act as engagement elements for respective pins (not shown in the drawings but easily imaginable) which protrude from the frame that lies directly above and are mounted so that they can slide in the slots of the rods.

Figure 2:
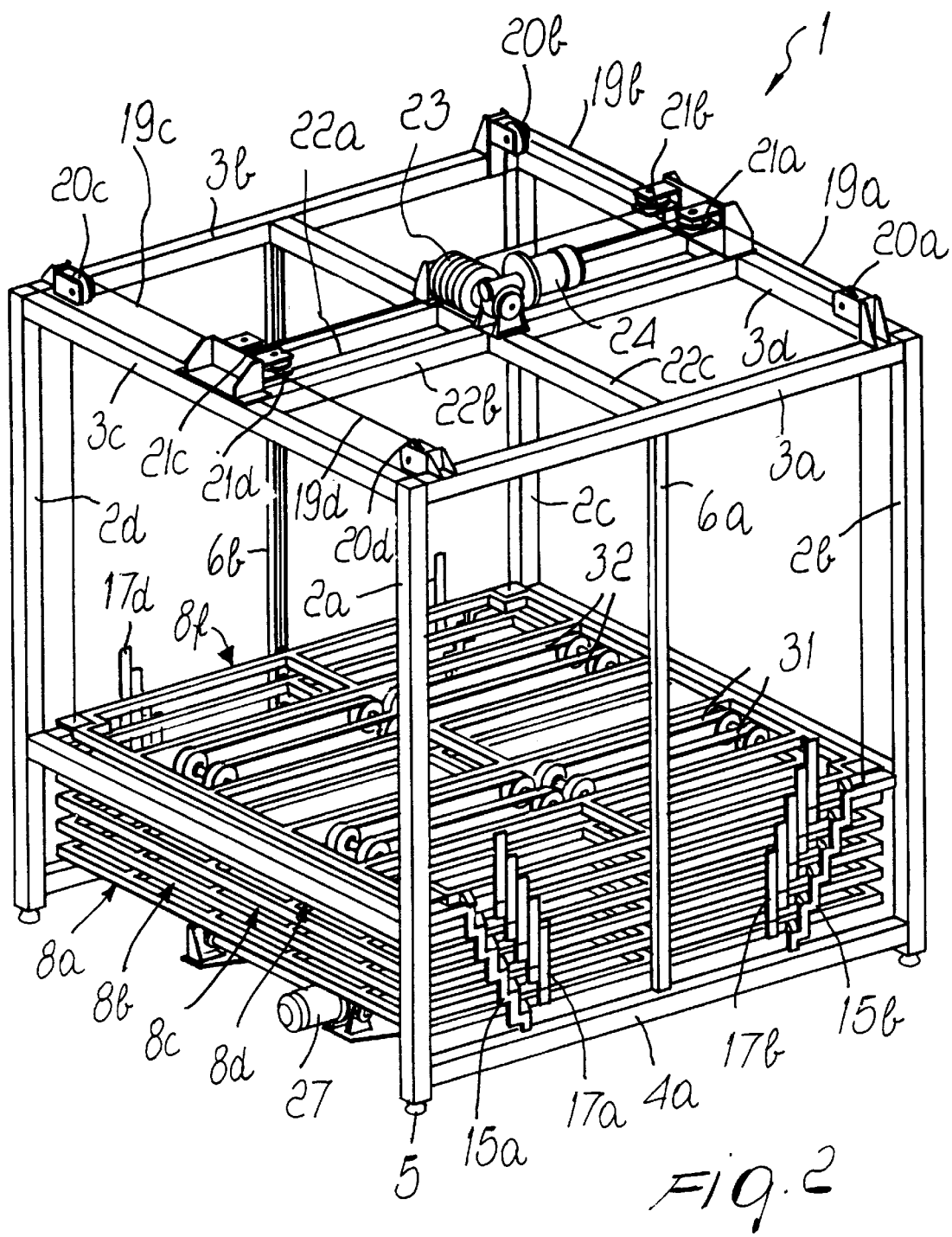
FIG. 2 is a perspective view of the apparatus with the mattress receiving frames in the lowered position.
Figure 3:
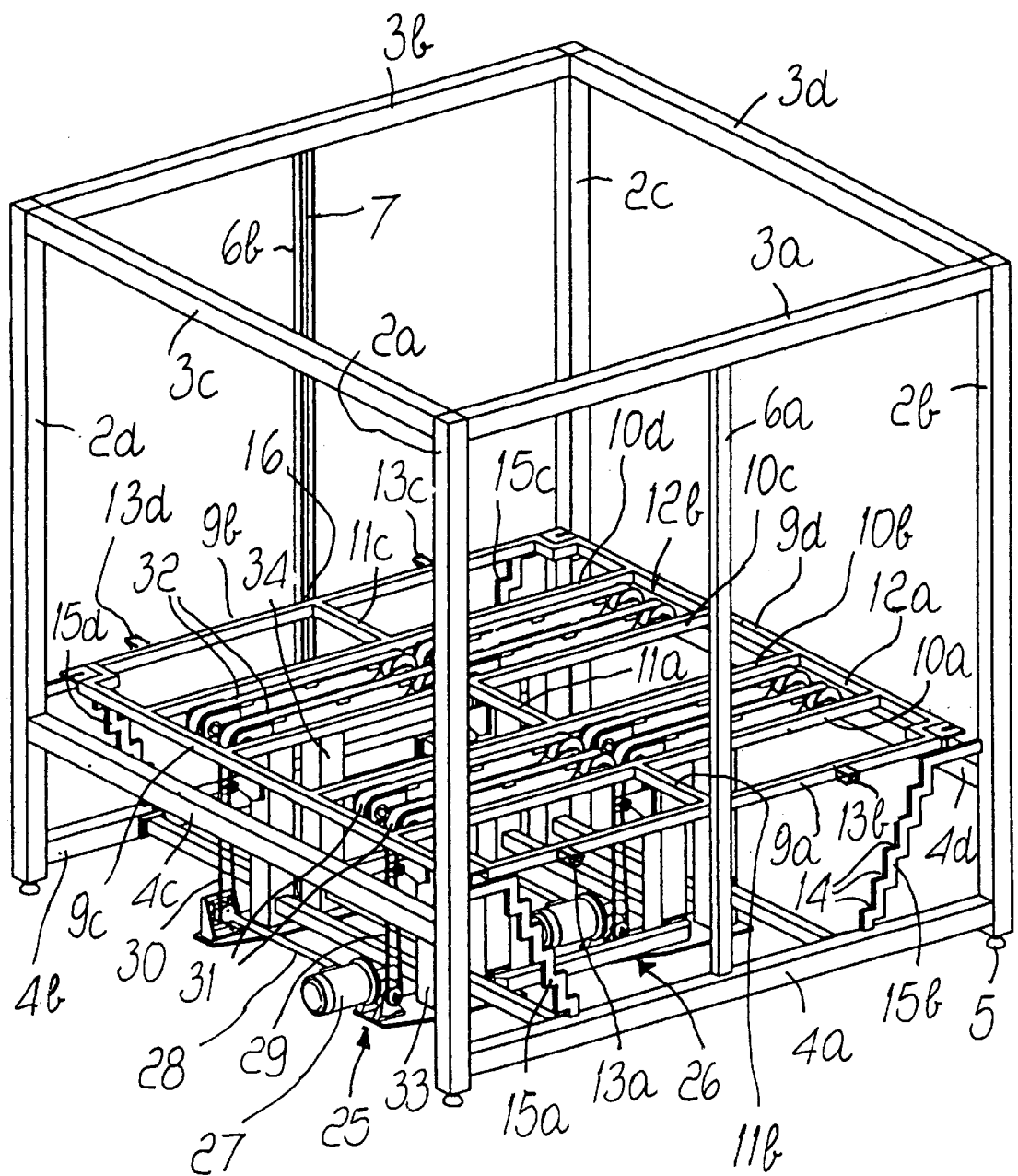
FIG. 3 is a perspective view of the invention without the frames, illustrating the elements meant to transfer the mattresses onto the frames and remove them from said frames.

The upper frame 8f has, at its corners, four plates 18 to which respective cables 19a, 19b, 19c, 19d are rigidly coupled (see FIG. 2). The cables 19a–19d are guided, by means of four pulleys 20a, 20b, 20c, 20d mounted at the top of the posts 2a–2d and by means of four additional pulleys 21a, 21b, 21c, 21d mounted halfway along the stringers 3c, 3d, toward the center of a crosspiece which is formed by two beams 22a, 22b which are fixed to the stringers 3c, 3d and by a beam 22c which is fixed to the stringers 3a, 3b. At the center of the crosspiece there is a drum 23 for winding and unwinding the four cables 19a–19d which is actuated by means of an electric gearmotor 24 which is fixed to the crosspiece.

In order to transfer the mattresses onto the frames 8a–8f and remove them from said frames there are two similar modules 25 and 26 installed at the base of the framework.

Each module 25, 26 comprises a gearmotor 27 which has an output shaft 28 which actuates, by means of two transmission chains 29 and 30, laterally adjacent mattress transfer and transport lines, each of which is composed of two pairs of mutually aligned belts; the belts that form one line are designated by the reference numeral 31, while the belts that form the other line are designated by the reference numeral 32. Each pair of belts 31, 32 is wound around pulleys keyed to shafts which are rotatably supported at the top of pillars 33, 34 so that the upper portions of the belts 31, 32 of one module 25 are aligned with those of the module 26. The belts 31, 32 of the two modules 25, 26 are mutually co-planar at a level which lies above the plane of the frame 8f when said frame rests on the uppermost steps 14 of the strips 15a–15d. In this manner, the belts 31, 32 form a platform for receiving both the mattresses that must be transferred to the magazine and the mattresses that must be removed from the magazine.

The mattresses are initially loaded into the magazine when the frames are all stacked below the receiving platform of the belts 31, 32 for resting the teeth 13a, 13b, 13c, 13d on the steps 14 of the strips 15a–15d. In this position, shown in FIG. 2, the belts 31, 32 protrude from the upper frame 8f of the stack through the openings 12a, 12b. By resting one edge of a mattress on the initial part of the upper portions of the belts 31 and 32, the actuation of said belts causes the transfer and positioning of the mattress above the upper frame 8f of the stack. When the mattress has reached the correct position above the frame 8f, an adapted stroke limiting switch stops the belts 31, 32. At this point the frame 8f, with the mattress arranged on top if it, is raised to free the underlying belts and allow to receive the next mattress. The frame 8f is lifted by actuating the gearmotor 24 and ofly the system of cables 19a–19d, until the four rods 17a, 17b, 17c, 17d fixed to the underlying frame 8e reach the end of their stroke.

Since the rods 17a–17d are slightly longer than the height of the mattresses to be loaded, enough space remains below the frame 8f to position the next mattress carried by the belts. The storage cycle can thus resume in the manner described above.

In order to remove the mattresses from the magazine, the frames 8a–8f are made to descend until they stop below the plane of the belts 21, 22, so as to deposit thereon the mattresses, which are removed by actuating the belts.

The removal or extraction of the mattresses can occur on the same side on which the mattresses were inserted or on the opposite side, as when the apparatus is included in a manufacturing line.

It has thus been observed that the invention achieves the intended aim and object. A substantial advantage of the apparatus is its flexibility in operation. For example, the simultaneous actuation of the belts 31, 32 can be used if the mattresses to be stored are large, such as mattresses for double beds. In the case of smaller mattresses, such as single-bed mattresses, it is possible to use the belts 31, 32 independently of each other in order to load two of said mattresses side by side in the magazine and remove them from said magazine individually and/or simultaneously.

The invention thus conceived is susceptible of numerous modifications and variations, all of which are within the scope of the inventive concept.

In one of these embodiments, instead of the system of cables 19a–19d there is a transmission which is composed of cable winding pulleys which are arranged at the corners of the frame and are mounted in pairs on two shafts which are actuated by a central gearmotor.

In another embodiment, the belts 31, 32 can be wound on rollers which are motorized by an internal motor.

In practice, the shapes and the dimensions may be any of to the requirements without thereby abandoning the scope of the protection of the appended claims.

The disclosures in Italian Patent Application No. BO98A000368 from which this application claims priority are incorporated herein by reference.

What is claimed is:

1. An apparatus for temporarily storing mattresses, comprising: a plurality of horizontal and superimposed frames for supporting mattresses to be stored; a framework for supporting said frames; guiding means for guiding said frames vertically, provided at said framework; actuation means for individually actuating said frames between a said vertical rods and in which said engagement pins slidingly engage.

2. The apparatus of claim 1, wherein said transfer and positioning lines are constituted by horizontal and parallel transport belts having upper portions extending on a plane which lies above said upper frame of said frame stack and form said receiving platform, said frames having openings for allowing passage of said transport belts during ascent and descent of said frames above and; respectively, below said receiving platform.

3. The apparatus of claim 2, wherein said transfer modules comprise each a gear-motor and transmission chains, said transmission chains being driven by said gear-motor and actuating said transport belts.

4. The apparatus of claim 3, comprising extendable elements connecting to each other said frames so as to allow spacing the frames during lifting above said receiving platform and to form said frame stack below said platform, said frames being constituted by rod-like elements which form said openings for the passage of said belts.

5. The apparatus of claim 2, wherein said frame actuation means comprise: an actuation gear-motor; a pulley system; cables; and a drum connected to said actuation gear-motor for winding and unwinding the cables which are rigidly coupled to the upper frame by way of said pulley system.

6. The apparatus of claim 5, wherein said frame guiding means comprise: vertical rods which are fixed to the framework; engagement pins protruding from said frames; slots provided on said vertical rods and in which said engagement pins slidingly engage.

7. An apparatus for temporarily storing mattresses, comprising: a plurality of horizontal and superimposed frames for supporting mattresses to be stored; a framework for supporting said frames; guiding means for guiding said frames vertically, provided at said framework; actuation means for individually actuating said frames between a lowered position, in which the frames are mutually close so as to form a frame stack, and a raised position, in which said frames are spaced from each other by an extent which is greater than a height of an individual mattress; a receiving platform for receiving the mattresses to be stored, said platform lying above an upper one of said frames of said frame stack; frame supporting means for supporting said frames when forming said stack, said frame supporting means comprising pairs of supporting teeth arranged each on a respective frame with distances between the teeth of each pair decreasing gradually from an uppermost frame towards a lowermost frame, and supporting steps connected to said framework so as to allow resting thereon of said pairs of supporting teeth; extendable connection elements, each one of said frames being connected to an overlying one by way of said extendable connection elements; and transfer means for individually transferring and positioning said mattresses on said receiving platform and for individually removing said mattresses from said receiving platform, said transfer means being synchronized with said actuation means for actuating said frames so that during storage of the mattresses the upper one of said frames of said stack is raisable until the mattress is brought to a level which, with respect to the receiving platform, is greater than the height of one mattress, while with the frames in the raised position, during mattress removal, the lowest one of said raised frames is lowerable below said receiving platform, so as to deposit the mattress onto said receiving platform.

8. The apparatus of claim 7, wherein said transfer means are constituted by horizontal and parallel belts having upper portions extending on a plane which lies above said upper frame of said frame stack and form said receiving platform, said frames having openings for allowing passage of said belts during ascent and descent of said frames above and, respectively, below said receiving platform.

9. The apparatus of claim 7, wherein said parallel and horizontal belts are arranged on two laterally adjacent lines.

10. The apparatus of claim 8, wherein said frame actuation means comprise: an actuation gear-motor; a pulley system; cables; and a drum connected to said gear-motor for winding and unwinding the cables which are rigidly coupled to the upper frame by way of said system of pulleys.

11. The apparatus of claim 16, wherein said frame guiding means comprise: vertical rods which are fixed to the framework; engagement pins protruding from said frames; slots provided on said vertical rods and in which said engagement pins slidingly engage.

12. An apparatus for temporarily storing mattresses comprising:

a plurality of horizontal and superimposed frames for supporting mattresses to be stored;

a framework for supporting said frames;

guiding means for guiding said frames vertically, provided at said framework;

actuation means for individually actuating said frames between a lowered position, in which the frames are mutually close so as to form a frame stack, and a raised position, in which said frames are spaced from each other by an extent which is greater than a height of an individual mattress;

a receiving platform for receiving the mattresses to be stored in a storing position, said receiving platform lying above an upper one of said frames of said frame stack;

transfer means comprising two transfer modules and two transfer and positioning lines, said transfer modules being actuatable independently for driving each a respective one of said two adjacent transfer and positioning lines so as to transfer and position said mattresses on said receiving platform and for removing said mattresses from said receiving platform, said transfer and positioning lines being driven, in any of a simultaneous and independent manner for transferring and positioning on, and removing from said receiving platform any of a single mattress, a pair of adjacent mattresses simultaneously, and a pair of adjacent mattresses in succession; and wherein said transfer modules are synchronized with said actuation means for actuating said frames so that during storage of the mattresses the upper one of said frames of said stack is raisable until the mattress is brought to a level which, with respect to the receiving platform, is greater than the height of one mattress, while with the frames in the raised position, during mattress removal, the lowest one of said raised frames is lowerable below said receiving platform, so as to deposit the mattress onto said receiving platform.

13. The apparatus of claim 12, wherein said transfer and positioning lines are constituted by horizontal and parallel transport belts having upper portions extending on a plane which lies above said upper frame of said frame stack and form said receiving platform, said frames having openings for allowing passage of said transport belts during ascent and descent of said frames above and, respectively, below said receiving platform.

14. The apparatus of claim 13, wherein said transfer modules comprise each a gear-motor and transmission chains, said transmission chains being driven by said gear-motor and actuating said transport belts.

15. The apparatus of claim 14, comprising extendable elements connecting to each other said frames so as to allow spacing the frames during lifting above said receiving platform and to form said frame stack below said platform, said frames being constituted by rod-like elements which form said openings for the passage of said belts.

16. The apparatus of claim 13, wherein said frame actuation means comprise: an actuation gear-motor; a pulley system; cables; and a drum connected to said actuation gear-motor for winding and unwinding the cables which are rigidly coupled to the upper frame by way of said pulley system.

17. The apparatus of claim 16, wherein said frame guiding means comprise: vertical rods which are fixed to the framework; engagement pins protruding from said frames; slots provided on said vertical rods and in which said engagement pins slidingly engage.

* * * * *